(12) United States Patent
Frenkel

(10) Patent No.: US 9,242,384 B2
(45) Date of Patent: Jan. 26, 2016

(54) FOOD SLICER

(71) Applicant: Elliot Frenkel, Far Rockaway, NY (US)

(72) Inventor: Elliot Frenkel, Far Rockaway, NY (US)

(73) Assignee: CULINARY EXPRESSIONS INC., Cedarhurst, NY (US)

( * ) Notice: Subject to any disclaimer, the term of this patent is extended or adjusted under 35 U.S.C. 154(b) by 168 days.

(21) Appl. No.: 14/116,036

(22) PCT Filed: May 7, 2013

(86) PCT No.: PCT/US2013/039899
§ 371 (c)(1),
(2) Date: Nov. 6, 2013

(87) PCT Pub. No.: WO2013/173123
PCT Pub. Date: Nov. 21, 2013

(65) Prior Publication Data
US 2014/0190019 A1 Jul. 10, 2014

Related U.S. Application Data

(60) Provisional application No. 61/646,513, filed on May 14, 2012.

(51) Int. Cl.
| | |
|---|---|
| *A47J 17/00* | (2006.01) |
| *B26B 3/04* | (2006.01) |
| *B26D 3/26* | (2006.01) |
| *A47J 9/00* | (2006.01) |

(Continued)

(52) U.S. Cl.
CPC . *B26B 3/04* (2013.01); *A47J 9/003* (2013.01); *A47J 17/00* (2013.01); *B26D 3/26* (2013.01); *B26D 5/10* (2013.01); *B26D 7/0608* (2013.01)

(58) Field of Classification Search
CPC ............. B26D 3/24; B26D 3/26; A47J 17/00; A47J 9/003; B26B 3/04
USPC ........... 30/173, 174, 114, 113.3; 99/537–544, 99/547, 551
See application file for complete search history.

(56) References Cited

U.S. PATENT DOCUMENTS 1,962,737 A * 6/1934 Gutmann ......................... 30/173
D576,454 S * 9/2008 Repac ............................. D7/693

(Continued)

FOREIGN PATENT DOCUMENTS

WO 2011100126 8/2011

OTHER PUBLICATIONS

International Search Report and Written Opinion dated Sep. 25, 2013 from the corresponding PCT/US2013/039899.

(Continued)

*Primary Examiner* — Ned Landrum
*Assistant Examiner* — Liang Dong
(74) *Attorney, Agent, or Firm* — Katten Muchin Rosenman LLP

(57) ABSTRACT

Disclosed herein is a food slicer comprising an upper portion having at least one pushing head with at least one pusher. The pushing head is located at a distal end of the upper portion. A lower portion having at least one slicing head with at least one blade and one opening is located at a distal end of the lower portion. The slicing head has a plurality of deflectable elements arranged therein. A connection portion coupled to a proximal end of the upper portion and a proximal end of the distal portion. The at least one pusher extends past the blade and through the opening of the slicing head when the food slicer is moved from an open position to a closed position.

11 Claims, 6 Drawing Sheets

(51) Int. Cl.
*B26D 5/10* (2006.01)
*B26D 7/06* (2006.01)

(56) References Cited

U.S. PATENT DOCUMENTS

| | | |
|---|---|---|
| 7,779,739 B2 * | 8/2010 | Peterson et al. ............... 83/858 |
| 2007/0044619 A1 | 3/2007 | Farid et al. |
| 2009/0078100 A1 | 3/2009 | Repac |
| 2009/0282990 A1 | 11/2009 | Farnum et al. |
| 2012/0017779 A1 * | 1/2012 | Abfall et al. ................... 99/538 |
| 2012/0102760 A1 | 5/2012 | Hauser |

OTHER PUBLICATIONS

International Preliminary Report on Patentability dated Apr. 16, 2014 from corresponding International Application No. PCT/US2013/039899.

* cited by examiner

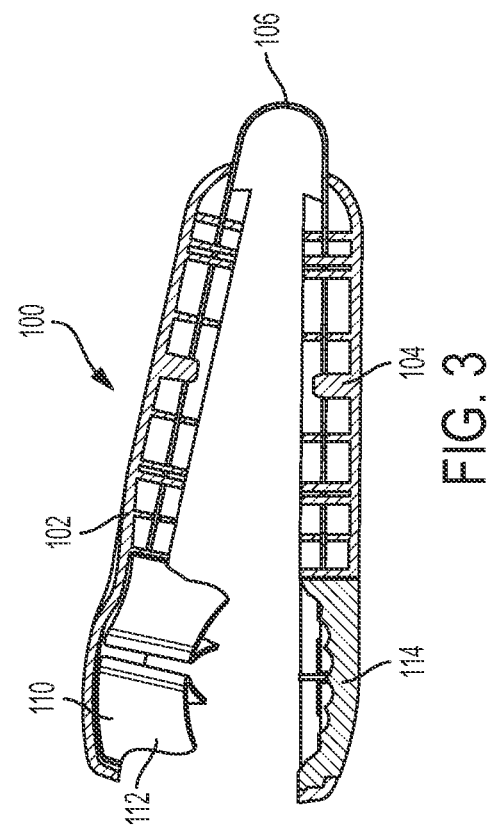
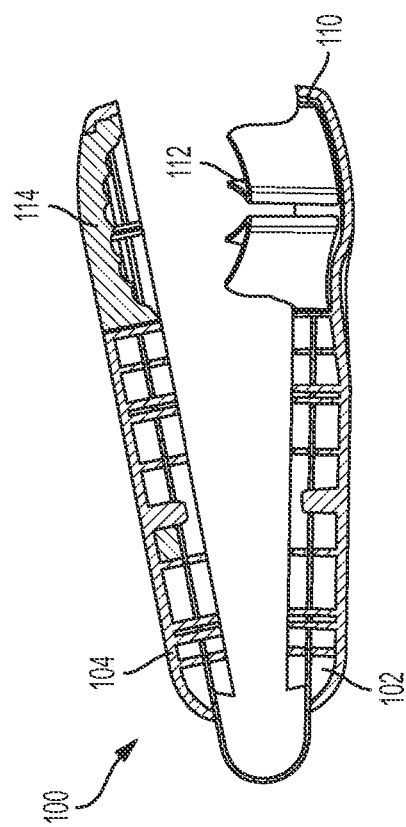
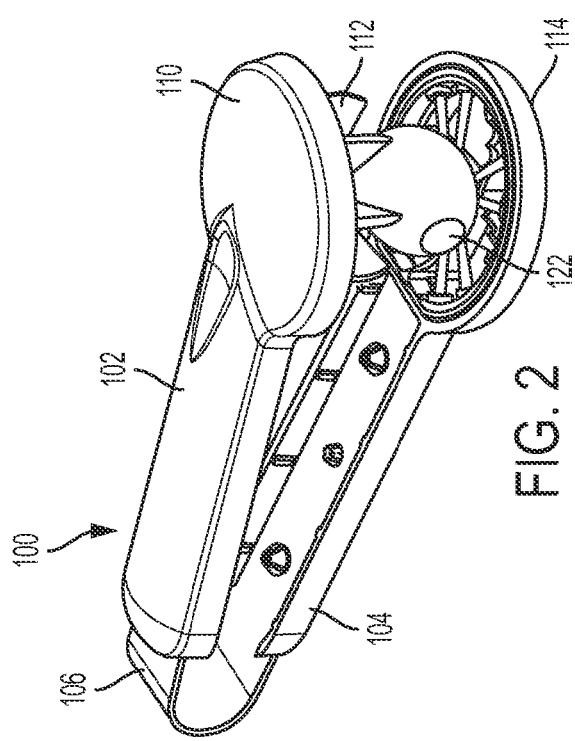
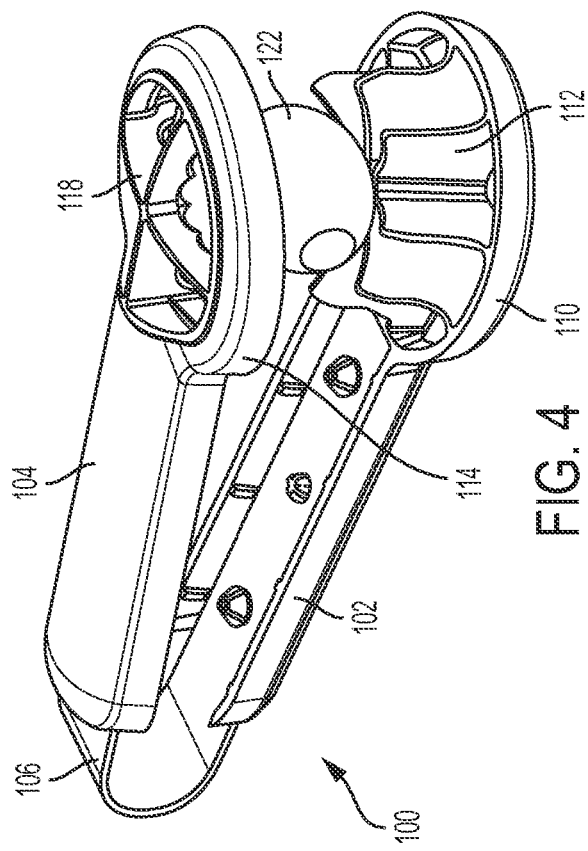

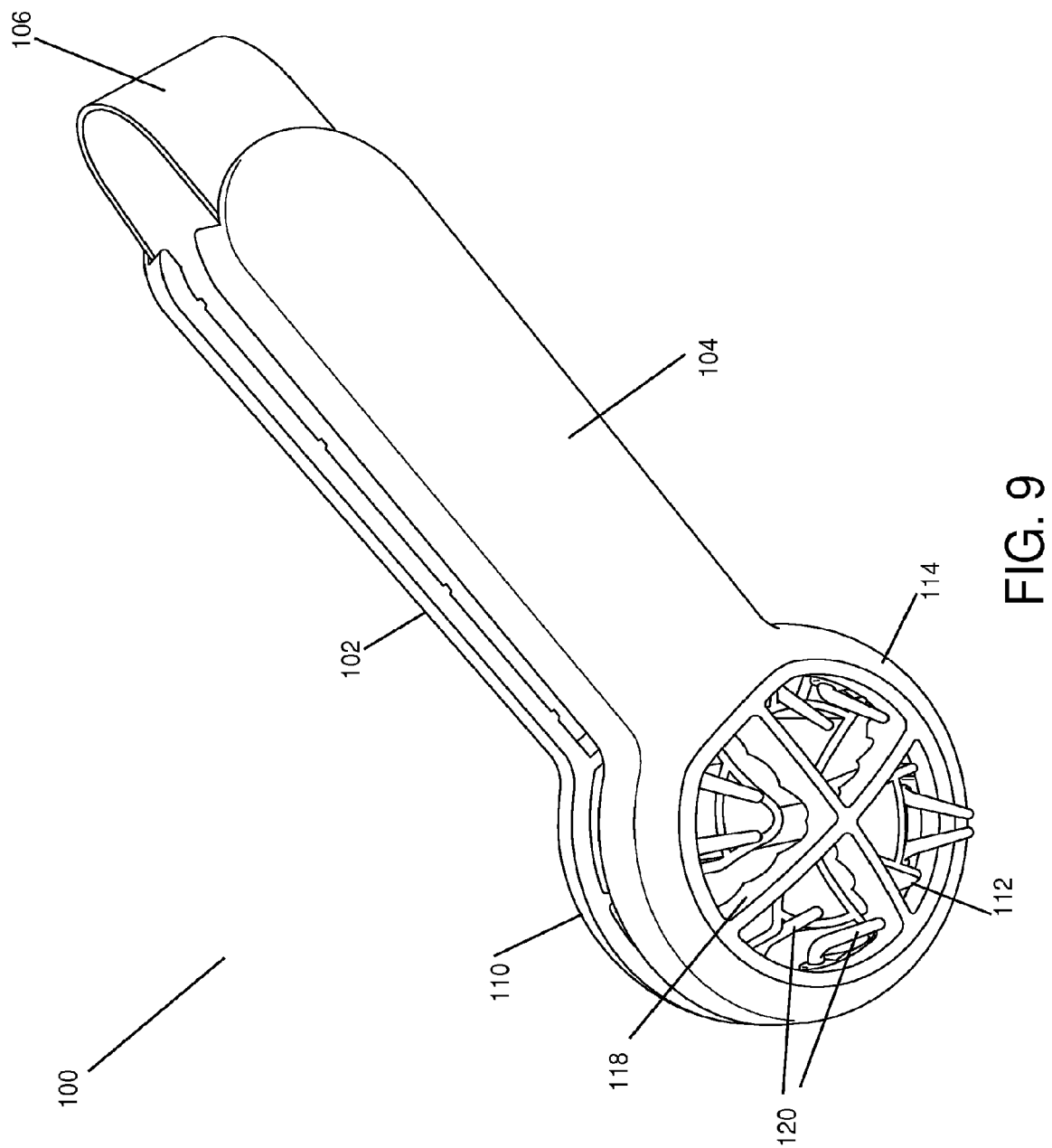

FOOD SLICER

FIELD OF THE INVENTION

The invention is directed to a device for automatically slicing food, such as fruits or vegetables, into a plurality of pieces. More specifically, the invention is directed to a slicer for slicing circular or oblong food, such as grapes, grape tomatoes, and/or cherry tomatoes, into a plurality of pieces.

BACKGROUND OF THE INVENTION

Many types of small fruit, such as grapes, are used by parents as snacks for children because of their health benefits and their relative ease of procurement year round. However, such small fruit may vary in size and potentially pose a choking hazard to small children and/or adults. In particular, grapes may pose a choking hazard to small children because the child may not have a fully developed set of teeth for properly chewing the grape prior to swallowing.

One solution to this problem is to cut the fruit using a knife prior to feeding them to children. However, this process may be tedious, messy, time consuming, complicated, complex, and dangerous because a person may slice a finger during cutting. Therefore, a need clearly exists for a quick and efficient device for slicing small fruit. Such a device could also aid in slicing fruit quickly in the preparation of a fruit salad, for example.

SUMMARY OF THE INVENTION

The present invention provides a food slicer comprising an upper portion having at least one pushing head with at least one pusher, wherein the pushing head is located at a distal end of the upper portion; a lower portion having at least one slicing head with at least one blade and one opening, wherein the slicing head is located at a distal end of the lower portion; and a connection portion coupled to a proximal end of the upper portion and a proximal end of the distal portion. The at least one pusher extends past the blade and through the opening of the slicing head when the food slicer is moved from an open position to a closed position.

BRIEF DESCRIPTION OF THE DRAWINGS

FIG. 2 depicts an alternate perspective view of the food slicer of FIG. 1;

FIG. 3 depicts a side view of the food slicer of FIG. 1;

FIG. 4 depicts a bottom perspective view of the food slicer of FIG. 1;

FIG. 5 depicts an alternate side view of the food slicer of FIG. 1;

FIG. 9 depicts an alternate perspective view of the food slicer of FIG. 1 in a closed position;

DETAILED DESCRIPTION OF THE INVENTION

Figure 1:
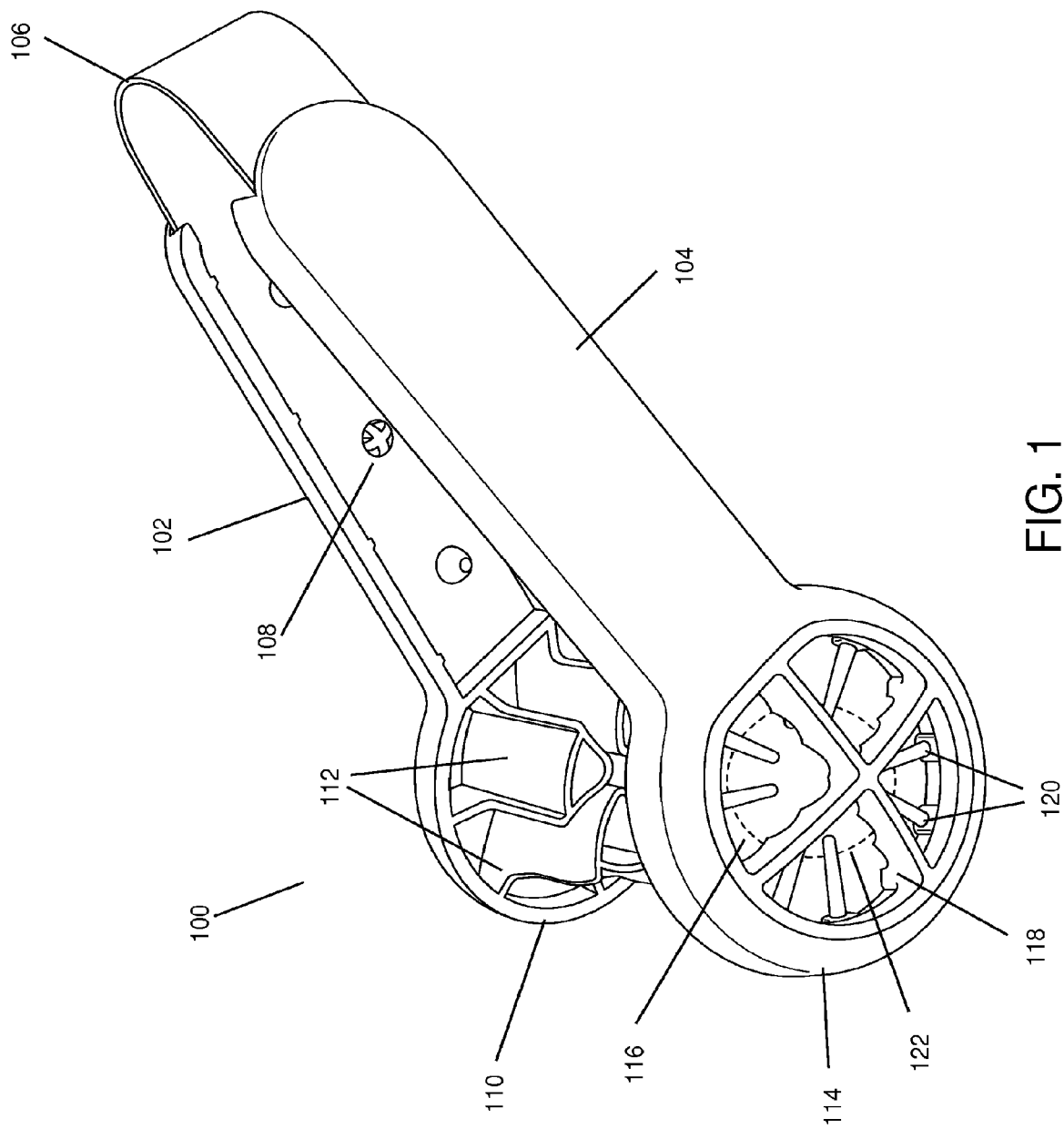
FIG. 1 depicts a top perspective view of the food slicer in an open position.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 8:
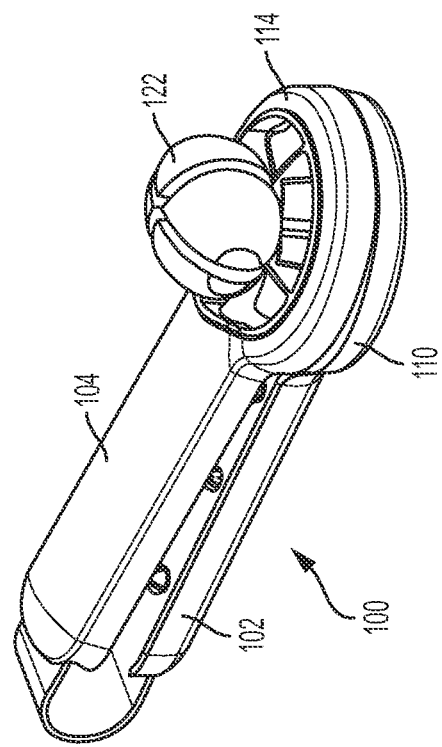
FIG. 8 depicts a bottom perspective view of the food slicer of FIG. 1 in a closed position.
Figure 7:
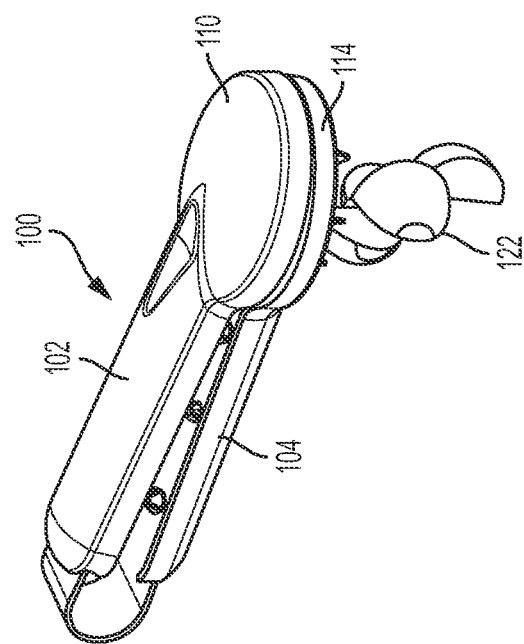
FIG. 7 depicts a top perspective view of the food slicer of FIG. 1 in a closed position.

Reference is now made to FIGS. 1-5 which depict food slicer 100 in an open configuration. As shown, food slicer 100 comprises upper portion 102 and lower portion 104 which are connected to connection portion 106 by screws 108 or other securing means. Preferably, connection portion 106 is formed from a flexible metal or plastic which provides resistive force to return upper portion 102 and lower portion 104 to the configuration shown in FIGS. 1-5 after they have been pressed together as shown in FIGS. 7-9. Any other spring-type means can also be used. In some embodiments, upper portion 102, lower portion 104, and connection portion 106 may be formed from a single piece of plastic or metal, similar to a pair of tongs. In other embodiments, upper portion 102 and lower portion 104 may contain a textured surface to allow food slicer 100 to easily be gripped by a user.

The distal end of upper portion 102 terminates at pushing head 110 which has a substantially circular shape. The interior of pushing head 110 comprises a plurality of pushers 112. As shown in FIGS. 1-5, pushing head 110 has four pushers 112. However, it should be obvious to one of skill in the art that any number of pushers 112 may be provided on pushing head 110. Further, the ends of pushers 112 may be formed such that their ends are open, as shown in FIG. 1, or closed. The ends of pushers 112 may also be "cup shaped," as depicted in FIG. 5, to better engage the top curved portion of food 122.

Figure 6:
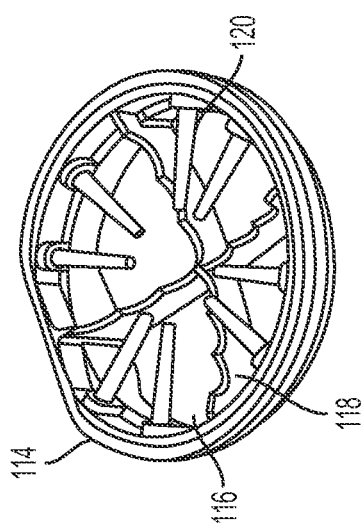
FIG. 6 depicts an enhanced view of the cutting head of the food slicer of FIG. 1.

The distal end of lower portion 104 terminates at slicing head 114 having a substantially similar shape to pushing head 110. As shown in FIG. 6, slicing head 114 comprises openings 116 which are shaped to accommodate pushers 112. Slicing head 114 further comprises blades 118 located between openings 116. Blades 118 may be either serrated or straight-edged depending upon the type of food to be sliced by food slicer 100. In a preferred embodiment, blades 118 are formed from a corrosive resistant material such as stainless steel or plastic.

Each opening 116 comprises one or more deflectable elements 120. The deflectable elements are arranged such that their tips support a food 122, such as a grape, above the blades 118 when the food slicer 100 is in an open position as shown in FIGS. 1 and 2. Deflectable elements 120 are preferably formed from a resilient flexible metal or plastic material.

To slice food 122, a user advances pushing head 110 toward slicing head 114 by squeezing upper portion 102 and lower portion 104 toward each other using one hand or two hands. The resulting configuration of food slicer 100 is shown in FIGS. 7-9. As this occurs, pushers 112 engage the top surface of food 122 and push food 122 past blades 118 which slice food 122 as the pushers 112 advance through openings 116. Concurrently, pushers 112 cause deflectable elements 120 to deflect as shown in FIG. 9, thus allowing food 122 to be sliced by blades 118 into four portions (corresponding to the four openings 116) as shown in FIG. 7.

Figure 11:
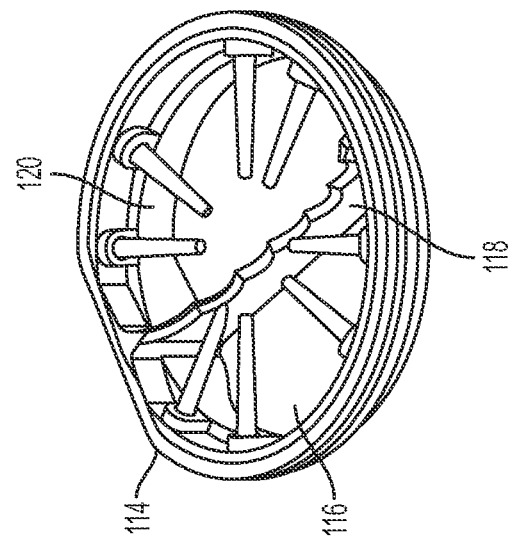
FIG. 11 depicts an enhanced view of the cutting head of the food slicer of FIG. 10.
Figure 10:
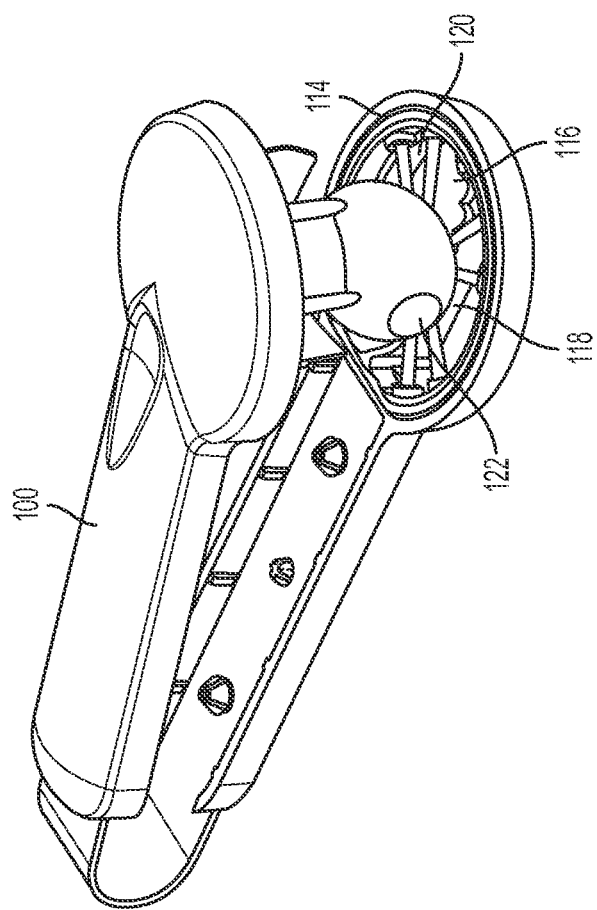
FIG. 10 depicts a perspective view of an alternate embodiment of the food slicer in an open position.
Figure 12:
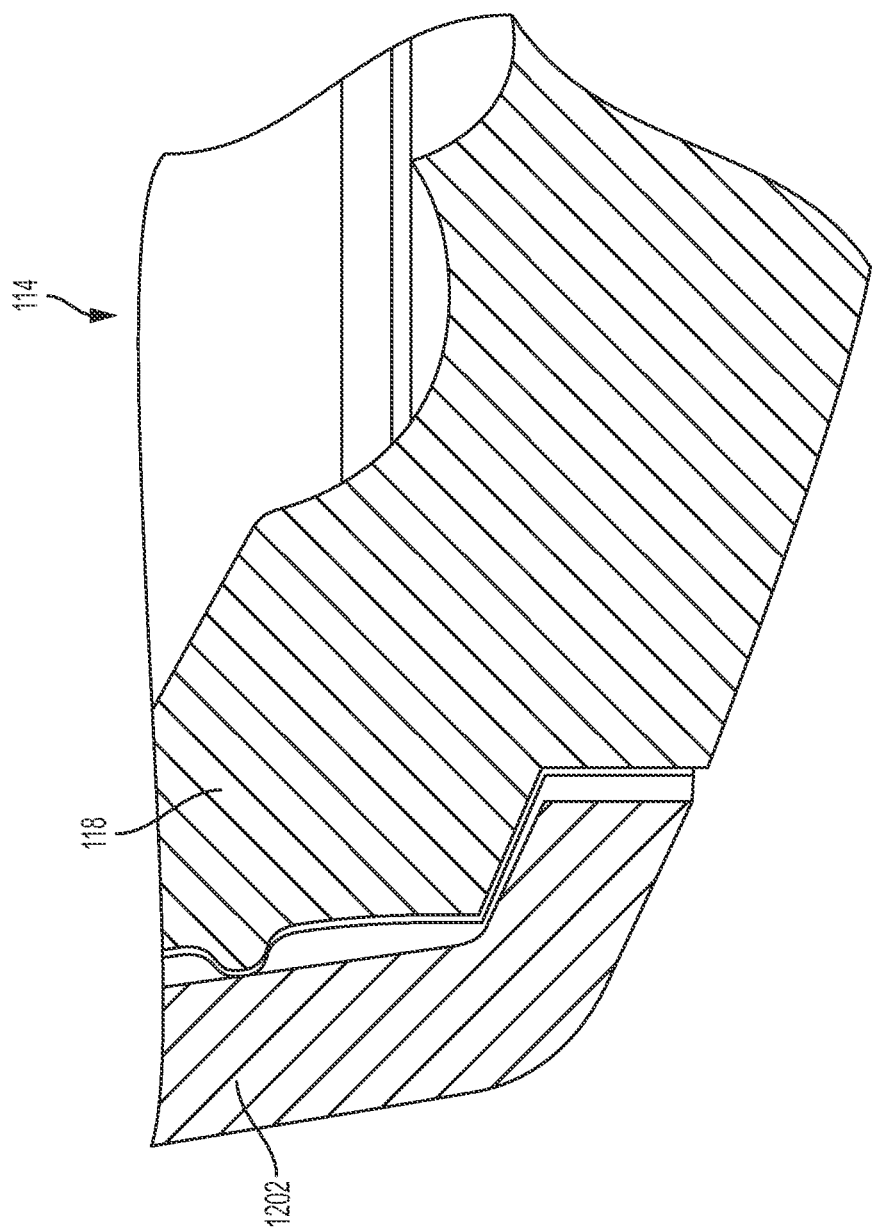
FIG. 12 depicts an enhanced view of the cutting head of the food slicer of FIG. 1.

However, the number of portions that food 122 is sliced into can be varied by changing the number of opening 116 and blades 118 in slicing head 114. For examples, FIGS. 10 and 11 depict an alternate version of food slicer 100 having a different slicing head 114 than that depicted in FIGS. 1-9. As shown in FIGS. 10 and 11, slicing head 114 contains two openings 116 which are divided by a single blade 118. This allows food 122 to be halved instead of being divided into four portions as shown in FIG. 7. In some embodiments, the number and arrangement of pushers 112 in pushing head 110 may need to varied based upon the arrangement of openings 116 and blades 118 in slicing head 114. Further, pushers 112 in pushing head 110 and blades 118 in slicing head 114 can be replaceable. For example, as shown in FIG. 12, the blades 118 can have snap beads 1202 formed theron to allow blades 118 to be removably attached to slicing head 114. Alternately, blades 118 can be permanently fixed to slicing head 114.

After food 122 has been sliced, a user then releases their grip on upper portion 102 and lower portion 104, allowing the food slicer 100 to return to its original configuration shown in FIGS. 1-5. Another food 122 can then be placed in food slicer 100 and the slicing process can be repeated.

In some embodiments, food slicer 100 may contain multiple pushing heads 110 branching off of the distal end of upper portion 102 which align with multiple slicing heads 114 branching off of the distal end of lower portion 104. Using this configuration, food slicer 100 can slice more than one item of food 122 at a time. In another embodiment, the size of pushing head 110 and slicing head 114 can be enlarged so that multiple items of food 122 can be placed in slicing head 114 to be simultaneously sliced.

While the present invention has been described at some length and with some particularity with respect to the several described embodiments, it is not intended that it should be limited to any such particulars or embodiments or any particular embodiment, but it is to be construed to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A food slicer comprising:
    an upper portion having at least one pushing head with at least one pusher, wherein the at least one pushing head is located at a distal end of the upper portion;
    a lower portion having at least one slicing head with at least one blade and one opening, wherein the at least one slicing head is located at a distal end of the lower portion;
    a connection portion coupled to a proximal end of the upper portion and a proximal end of the lower portion; and
    a plurality of deflectable elements located on the at least one slicing head extending from an outer rim of the slicing head towards a center of the at least one slicing head, the plurality of deflectable elements centering food placed in the slicing head over a center of the at least one slicing head,
    wherein the at least one pusher deflects the plurality of deflectable elements when the food slicer is moved to a closed position to allow sliced food to pass through the at least one slicing head, and
    wherein the plurality of deflectable elements are a plurality of conical fingers extending toward the at least one blade.

2. The food slicer according to claim 1, wherein the upper portion and the lower portion comprise a textured surface.

3. The food slicer according to claim 1, wherein the upper portion, the lower portion, and the connection portion are integrally formed.

4. The food slicer according to claim 1, wherein the connection portion is formed from a resilient u-shaped plastic or metal material.

5. The food slicer according to claim 1, wherein the at least one opening is sized to surround the at least one pusher when the food slicer is in a closed position.

6. The food slicer according to claim 1, wherein the distal end of the upper portion comprises a plurality of pushing heads and the distal end of the lower portion comprises a plurality of slicing heads.

7. The food slicer according to claim 1, wherein the at least one blade is attached to the at least one slicing head by a snap fit connection.

8. The food slicer according to claim 1, wherein a terminal end of the at least one pusher is curved.

9. The food slicer according to claim 1, wherein the upper portion and the lower portion are formed from plastic or metal.

10. The food slicer according to claim 1, wherein the at least one blade is plastic or metal.

11. The food slicer according to claim 1, wherein the plurality of deflectable elements are plastic or metal.

* * * * *